United States Patent [19]

Goering et al.

[11] 4,116,770

[45] Sep. 26, 1978

[54] WAXY BARLEY STARCH WITH UNIQUE SELF-LIQUEFYING PROPERTIES

[75] Inventors: Kenneth J. Goering; Robert Eslick, both of Bozeman, Mont.

[73] Assignee: Research Corporation, New York, N.Y.

[21] Appl. No.: 553,680

[22] Filed: Feb. 27, 1975

[51] Int. Cl.$^2$ .................. C12D 13/02; A01H 1/02; C07G 17/00

[52] U.S. Cl. ............................ 195/63; 47/58; 47/DIG. 11; 127/29; 127/32; 195/31 R

[58] Field of Search ............ 47/DIG. 1, 58; 127/29, 127/32; 195/66 R, 31 R, 70, 63, 62, 26, 64, 24, 18, 25, 65; 426/28

[56] References Cited

U.S. PATENT DOCUMENTS

| | | | |
|---|---|---|---|
| 3,576,645 | 4/1971 | Rozsa et al. | 195/70 |
| 3,720,583 | 3/1973 | Fisher | 195/31 R |
| 3,783,100 | 1/1974 | Larson et al. | 195/31 R |

OTHER PUBLICATIONS

Wilson et al., *Botany*, 4th ed., Holt, Rinehart, and Winston, New York, (1967), pp. 276–284.

Sandstedt et al., "α-Amylase Adsorption on Raw Starch and its Relationship to Raw Starch Digestion", *Chemical Abstracts*, vol. 72, No. 25, p. 29 (1970)Abs. no. 128863n.

MacGregor et al., "Site of α-Amylase in Developing Barley Kernels", *Chemical Abstracts*, vol. 73, abs. no. 31639j, p. 281, (1972).

Goering et al., "Barley Starch. IV. A Study of the Cooking Viscosity Curves of Twelve Barley Genotypes", *Cereal Chemistry*, vol. 47, pp. 592–598 (Sep. 1970).

Goering et al., "Barley Starch. V. A Comparison of the Properties of Waxy Compana Barley Starch with the Starches of its Parents", *Cereal Chemistry* vol. 50, pp. 322–328 (May–Jun., 1973).

Meredith et al., "Amylases of Developing Wheat, Barley, and Oat Grains", *Cereal Chemistry*, vol. 50, pp. 243–254, (May–Jun. 1973).

*Primary Examiner*—Raymond N. Jones
*Assistant Examiner*—Thomas G. Wiseman
*Attorney, Agent, or Firm*—Oblon, Fisher, Spivak, McClelland & Maier

[57] ABSTRACT

Barley starch granules are prepared which have been found to have native amylase bound sufficiently tenaciously onto the starch granule, such that it is not extracted during ordinary separation of the starch from the grain, and hence has the property of being self-liquefying when the granules are heated to a temperature of from 67° to 75° C. These granules are obtained by separation from a novel variety of barley formed by crossbreeding a first barley variety characterized by a hulless gene $n\ n$ on chromosome 1 and a second barley variety which is characterized by a waxy endosperm gene $wx\ wx$ on chromosome 1. In one embodiment of this variety, the first variety cross-bred is characterized by both a short awn gene $lk2\ lk2$ and a hulless gene $n\ n$ on chromosome 1. In the most preferred embodiment, a variety now called Washonupana has been discovered which will yield the novel granules of this invention.

14 Claims, No Drawings

WAXY BARLEY STARCH WITH UNIQUE SELF-LIQUEFYING PROPERTIES

BACKGROUND OF THE INVENTION

1. Field of the Invention

This invention relates to the cross-breeding of a novel variety of barley which has been found to have the unexpected property that the starch granules recovered therefrom are self-liquefying without the addition of any further quantities of enzymes.

2. Description of the Prior Art

Starch is usually obtained in the form of granules by separation from starch-containing plants or plant parts. In most manufacturing processes which utilize starch, such as in the brewing of beer, the preparation of confectionary, paper manufacture or the like, the starch is first pasted and then liquefied by cleavage of the starch molecule to reduce the viscosity of the paste. The granules are initially insoluble in water, but when heated in water, they begin to swell, imbibing water rapidly until they are many times their original size. Upon continued heating, the granules begin to disintegrate and the viscosity of the water-starch mixture beings to rapidly increase until it reaches a maximum, thereby forming a paste. If the starch is a waxy starch, as is the starch of the present invention, further heating after the maximum viscosity is reached results in an initial drop in viscosity. However, cooling of the partially solubilized paste causes the hydrated molecules and segments of granules to insolubilize, forming a paste probably through H-bonding of starch chains. In the case of normal starch, this paste, on cooling, will form a stiff gel. Waxy starches will remain somewhat fluid. This initial cooking phase usually requires heating to temperatures in the range of 85°–105° C., depending upon the particular variety of starch being treated. In this critical cooking phase, viscosities as low as 300–400 Brabender viscosity units (B.U.) are attainable. However, under microscopic examination, the granules will show a substantial increase in size.

The pasted starch can then be treated in many ways, such as by acid treatment to effect a conversion of the starch directly to sugars or dextrins or by molecular cleavage by acid or enzymes. It also can be oxidized or cross-linked to prepare special starch derivatives.

In enzyme conversion, the enzymes rupture bonds in the starch, resulting in a reduction in molecular weight. Liquefication is said to occur when a starch paste containing 8% starch dry basis shows a Brabender viscosity in the range of 0–20 units. However, the exact extent of liquefication will be determined by the particular application for the starch.

One of the largest uses of starch is for coating paper where it increases the strength, causes the fiber to lay down, makes the surface better able to take ink for printing and increases resistance to wetting. For this purpose, starch is added to water, heated to boiling or run through a pressure cooker, cooled to conversion temperature, commercial enzyme added and the starch held until the viscosity reaches the desired point, which is determined by time of flow through a special pipette. At this point the mixture is rapidly heated to boiling to denature the enzyme.

It would be desirable, however, to provide a starch which has a much lower pasting temperature than known starches, so that the period for heating to effect pasting can be reduced. Likewise, if a starch could be developed which is self liquefying, the preliminary cooking step now being used, could be eliminated.

In the past, where it has been desired to liquefy the paste, such as in brewing, enzyme conversion to liquefy the paste was accomplished by addition of an enzyme into the paste followed by mild heating. For instance, to make a liquefied product suitable for beer brewing, a malt infusion was first prepared which contained a high percentage of α-amylase, which the infusion was added to the starch paste.

In normal brewing operations, part of the barley malt is added to the adjunct (corn starch, rice, or corn grits) and the mixture heated to boiling. During the heating process, the starch is gelatinized and partially converted; however, the enzyme is destroyed before the process is completed. The cooked adjunct is then added to the main malt mash which is heated to 65° C., held for a half hour and then gradually heated to 75° C. where it is maintained for 3–4 hours in order to convert and extract as much material as possible.

It is known that although natural cereal grains do not contain substantial amounts of α-amylase, the quantity (activity) of the enzyme in the starch upon germination (malting) increases by factors of from 2000 to 10,000. That is, the units of activity of the enzyme of barley goes from 0.045 before malting to 90.0 after malting. Unfortunately, this high enzyme content is ordinarily lost during extraction and in the initial cooking phase of most starches.

It was long recognized that if the enzyme could be protected during these initial processing stages, then a self-liquefying starch could be obtained which would not require the addition of further enzymes to the starch paste. However, heretofore no satisfactory technique for protecting the enzyme has been developed. For instance, consideration was given to bind the enzyme by lime water treatment so that it is not steeped from the grains too quickly, or by formaldehyde treatment or the like. None of these techniques, however, has proven to be commercially acceptable or to protect a large enough percentage of the enzymes.

If a starch granule could be developed which would be self-liquefying without the addition of further enzymes, or, even more desirably, without cooking, the industrial demand for such a starch source would be quite significant. The starch source could be useable as a replacement for corn syrup in the brewing industry and, if the source were prepared from barley grain, it would have a substantially lower cost and, hence, would be quite competitive with corn syrup. Since it would enable the elimination of at least one and possibly two processing steps normally required for the utilization of starch, it would be highly advantageous in a wide variety of applications.

SUMMARY OF THE INVENTION

Accordingly, it is one object of this invention to provide a starch granule which contains a high percentage of amylase, and which binds the amylase such that after separation of the granules from the grain, the enzyme will continue to exhibit sufficient activity to cause self-liquefication of the starch without the addition of an outside source of enzymes.

A further object of this invention is the formation of a novel variety of barley starch granules which is characterized by the presence of a high percentage of enzymatic activity due to the presence of amylase which enables the starch to be liquefied without the addition of further amounts of enzymes.

A still further object of this invention is to provide barley starch granules which have sufficient enzymatic activity such that they can effect the liquefication of a larger amount of other forms of starch, without the necessity of additions of more enzymes from other sources.

These and other objects of this invention have now herein been attained by the cross-breeding of a barley variety which is characterized by a hulless gene ($n\ n$) on chromosome 1 and a barley variety which is characterized by a waxy endosperm gene ($wx\ wx$) located on chromosome 1. In a preferred embodiment, the first variety has both a hulless gene $n\ n$ and a short awn gene $lk2\ lk2$ on chromosome 1.

It has surprisingly been found that barley starch granules recovered from varieties produced in this manner have a substantial amount of amylase so tenaciously bound to the granules, that ordinary separation procedures will not result in the complete extraction of the enzyme, nor will the temperatures necessary for pasting of the granules result in inactivating of the enzyme. This is especially unique if one remembers that unmalted cereals do not normally contain appreciable $\alpha$-amylase. The starch granules produced are therefore self-liquefying without the addition of further amounts of enzyme. It has been found that the effectiveness of the granules as a saccharifying agent is so high that the granules are even capable of liquefying much larger quantities of additionally added starch materials.

BRIEF DESCRIPTION OF THE DRAWINGS

The unexpected attributes of the starch of this invention are shown in the drawings, in which:

FIG. 1 show Brabender amylograms at the 8% level on Washonupana starch with and without amylase inhibitor;

FIG. 2 shows Brabender amylograms on 20% Washonupana starch and 80% waxy maize starch at the 8% level with and without amylase inhibitor, held at 70° C. for one hour before cooking; and FIG. 3 shows Brabender amylograms on 20% Washonupana starch and 80% regular corn starch at the 8% level with different holding times before cooking.

DETAILED DESCRIPTION OF THE PREFERRED EMBODIMENTS

According to the present invention, breeds of barley are produced by cross-breeding two cultivars of barley, one cultivar of which has a hulless gene ($n\ n$) on chromosome 1 and one of which has a waxy endosperm gene ($wx\ wx$) located on chromosome 1. In a preferred embodiment, the first variety has both a short awn gene $lk2\ lk2$ and a hullness gene $n\ n$ on chromosome 1. Cross-breeding can be accomplished by hand crossing the flowers of each of the two varieties so as to produce $F_1$ seed, followed by selection in the $F_2$ of the desired genotype, $n\ n\ wx\ wx$, or $n\ n\ lk2\ lk2\ wx\ wx$. As one example of this cross-breeding, a barley grain now referred to as "Washonupana" was prepared from the following pedigree:

'Waxy Oderbrucker'/7* 'Compana'/2/ 'Sermo'/7* 'Compana',$F_4$ The variety is a composite of a number of selected $F_3$ lines. The breeding history of Compana from which the Washonupana is prepared is found in Technical Bulletin No. 1224, USDA, Classification of Barley Varieties Grown in the U.S. and Canada in 1958.

The Washonupana cultivar was grown in two locations, one at Mesa, Arizona, and the other at Bozeman, Montana. A Plant Variety Certificate Application was filed for the Washonupana Barley concurrently with the filing of the present application.

Although various barley variety seeds have been hand cross-bred in the past in essentially the same manner as carried out in the present invention, the object and result of the prior art cross-breeding has been to obtain a new variety having the characteristic of each of the varieties being cross-bred. One surprising and unexpected aspect of the present invention, however, is the discovery that the new barley variety of this invention possesses a characteristic not present in either of the two varieties being crossed, nor a composite characteristic of any or all of the varieties cross-bred, namely, that it contains substantial amylase and that the amylase is bound with such high tenacity to the starch granules that only a minimal amount is extracted during normal separation of the granules from the grain, and only a minimal amount is inactivated during pasting. The result is a starch granule which is self-liquefying, i.e., does not require the addition of further enzymes to effect liquefication.

What makes this characteristic even more unexpected and surprising is that ordinarily unmalted or non-germinated cereals, such as wheat, barley, maize, sorghum, rice or the like, do not contain appreciable amounts of $\alpha$-amylase. In contrast, not only does the barley variety of this invention possess high amounts of enzyme, but its bonding onto the starch is unique.

The amylase enzyme is presumed to be predominantly $\alpha$-amylase. However, it is theorized that a substantial amount of iso-amylase might be present, and it will deliquefy the starch by debranching the amylopectin.

The starch granules from the cross-bred barley can be separated by conventional techniques. For instance, the grain is first steeped in an aqueous solution containing sulfur dioxide, or in a solution containing a material which is a source of sulfur dioxide, such as metabisulfite, the quantity of sulfur dioxide may be sufficient to provide a solution of 0.1 to 0.4 wt%, and preferably 0.1 to 2wt%. The steeping temperature should be adjusted to between 45° to 55° C. Above 55° C., the possiblity of gelation is enhanced and the milled grain becomes unmanageably viscous. Below 45° C., the steeping time becomes unacceptably lengthy. The pH of the steeping solution should be slightly acidic, i.e., approximately of pH 4.5-7, and preferably pH 5-6 which can be adjusted by the addition of lactic acid. In continuous operations, the lactic acid is furnished by natural fermentation maintaining the initial grain in an acid condition. The lactic acid also functions to stop fermentation which might otherwise occur.

The effect of steeping treatment is to swell the grains and to extract the soluble proteins. The swollen grains are then water washed, several times if necessary, and milled. A burr mill or a bar mill is suitable for this purpose. Milling tears the grains apart and releases its component granules. The milled grain, in a slurry form, is then passed through a screen to separate out fibers or larger unmilled or insufficiently milled particles. There is no criticality in the screen size; however, screens of at least 150 mesh have been found to be acceptable. The overs from the screening process are mixed with water and are remilled. The slurry granules passing through the screen are then subjected to a smaller screen, such as a screen of at least 400 mesh. That portion of the slurry which passes through the second screen appears as a "cream". The starch granules can be recovered from the cream by centrifugal action. The recovered granules are of a size of from $2.5\mu$ to $40\mu$. Even if a barley species contained a substantial amount of amylase before malting (and none have to date been reported) the above separation procedure would be expected to result in the extraction of almost all of the enzyme. In face, separation of the enzyme from the starch granules has been the basis for making "malt infusions" which have been prepared by steeping a partially germinated grain of barley to form an infusion of the malt which is partly evaporated under vacuum to form a dark syrup useable as a starch digestant. That portion of the $\alpha$-amylase which was not extracted would thereafter invariably be inactivated during the subsequent cooking of the starch to effect pasting.

Prior art attempts have been made to maintain the enzymatic activity of the grains by various treatments (U.S. Pat. Nos. 3,272,718, 1,153,641 and 311,646); however, the purpose of the prior treatments was to obtain a higher quantity of the enzyme in the malt infusion, rather than to maintain the enzyme in the starch granule.

When the granules of the barley varieties, obtained according to this invention, are conventionally separated from the grain and used, the enzymatic activity is not lost either during the separation procedures, or during the pasting.

The pasting temperature of the barley varieties produced by this invention is another surprising and unexpected feature of this invention, in that it is substantially lower than the pasting temperature of all varieties of barley starch previously examined. However, on the assumption that the low pasting temperature might cause liquefication of the starch before the enzyme was inactivated, a series of experiments were conducted in which the temperature was held at 70° C. for 1 hour before cooking. This should have been sufficient to inactivate a substantial portion of the enzyme. However, quite unexpectedly, the enzyme was not inactivated, and on the contrary, sufficient activity was retained such that the enzyme not only successfully liquefied the starch when it was taken to 92.5° C. for 10 min and then cooled to 50° C., but it also liquefied 4 times its weight of waxy maize, an arbitrarily selected different starch source, having no active enzyme.

This experiment was repeated except using unmodified corn starch instead of the waxy maize. This was selected as the additive starch source, since 70° C. is not high enough to completely paste this type of starch, whereas 70° C. appears to completely paste the waxy maize used in the previous experiment. The assumption was that the pasted corn starch would more effectively gelatinize at temperatures higher than 70° C. and this effect might offset the more rapid denaturation of the $\alpha$-amylase resulting from the higher temperature. However, it was found as a quite surprising aspect of this invention, that the mixture of the 20% barley starch containing the amylase, and 80% of the unmodified corn starch, with no addition of any outside source of enzyme, liquefied by heating for 1 hour at 70° C.

The range of application of this new starch source is quite significant. In paper applications, this new starch is used by being admixed with normal corn starch, and a paste can be formed without either preliminary cooking or enzyme addition. It is only necessary to admix the two types of starches and to heat until the proper viscosity is obtained, after which the enzyme can be denatured. The simplicity of this result should be compared with present procedures, which require pre-cooking to a high temperature to effect pasting, cooling, addition of enzyme, heating to proper viscosity, and denaturing of the enzyme by cooking.

The starch granule of this invention can be used for thinning mashes and it can be used as a highly efficient malting agent to replace barley malt infusions. It thus can be used in the brewing industry to make an all barley beer, which might eliminate expensive adjuncts such as rice.

It is not known yet how or why the amylase remains bound to the starch granules, although it is suspected that some type of complexing occurs due to the nature of the starch granules. The present inventors have isolated more than 50 starches from different barley varieties, and this is the first instance found in which the amylase is associated with the isolated granules. Moreover, since a significant quantity of amylase would be expected to be lost in the starch separation, regardless of binding, one would expect a rather high concentration of the enzyme in the initial seed. This represents still another surprising and unanticipated aspect of this invention, since very little $\alpha$-amylase is supposed to be present in ungerminated cereals.

The starch granules prepared according to the method of this invention will paste at temperatures of from 65° to 75° C., and most often at a temperature of 73° C. The starch will then liquefy by destruction of molecular bonds within the starch at temperatures of from 66° to 92.5° C. An increase of temperature beyond 92.5° C. will not affect results (see FIG. 1) except that heating to the boiling point will deactivate the enzyme. The paste can be stabilized at any viscosity between 10 and 1000 Brabender units. After deactivation of the enzyme, the paste will be stable as a viscous solution. If the starch had no enzyme present, its viscosity would continue to increase with temperature (FIG. 1) until it reached a maximum at approximately 85° C. Since the starch of this invention reaches a maximum viscosity at below the 85° C. point, i.e., about 65°–75° C., the logical conclusion seems to be that the enzyme conversion is occurring almost as rapidly as the starch becomes pasted.

The time necessary for pasting and liquefication, depending on temperature, is from 3 minutes to 80 minutes, with a preferred range being from 5 to 15 minutes. The pasting and liquefication can take place either in a single step, or in dual steps. For instance, the starch can be heated to the above-indicated pasting temperature range for a period of from 1 to 60 minutes and then further heated to a higher temperature for a period of from 1 to 20 minutes. Alternatively, the starch can be heated to a temperature of from 66° to 75° C. and held for 1 to 20 minutes until the desired liquefication is attained as measured by viscosity tests. One suitable technique for the measurement of viscosity is by the Brabender method, as reported by Smith, R. J., "Viscosity of Starch Paste". *Methods in Carbohydrate Chemistry*, ed. by R. C. Whistler, Vol. 4, pp. 114, Academic Press, N.Y. (1964).

The starch granules of this invention can be admixed with another non-self liquefying starch source, and the granules of this invention will not only self-liquefy, but will liquefy the additional starch source as well. Suitable other starch sources which can be admixed with the starch granules of this invention include unmodified maize, waxy maize starch, potato starch, corn cockle starch, rice starch, sorghum starch, arrowroot starch, sago starch, tapioca starch, canna starch, sweet potato starch, chick pea starch, pea starch, waxy sorghum starch, wheat starch, waxy rice starch, or mixtures thereof. The starch granules of this invention can be admixed with from 0 to 500% by weight and suitably 100–500% weight of the additive starch, depending, of course, on the particular additive starch source used.

The starch is admixed with 2 to 20 weight parts of water per part of starch to effect the pasting and subsequent liquefication. Other additives may also be present, if desired. For instance, additives such as 0.5% by weight of vegetable gums and their derivatives, carboxymethyl cellulose, methyl cellulose and its derivatives, hydroxyethyl cellulose, ethylhydroxyethyl cellulose, cereal hemicelluloses, agar, algin, carrageenan, laminaran, deacetylated chitin, gum arabic, gum karaya, gum ghatti, guar gum, corn hull gum, locust bean gum, pectin, xylan, tragacanth, acacia, tamarind, dextran may be present in amounts of up to about 3%. Of course, the actual amount which may be used in any particular application will depend upon the application itself and the viscosity of the additive.

The mixture of starches can be heated to temperatures of from 67° to 85° C. until the desired viscosity is attained, without the necessity of adding any further amounts of enzyme. Of course, under appropriate circumstance, there is no reason why additional amounts of enzyme could not be added, if desired. However, the amounts of enzyme constributed by the barley starch of this invention, can be entered into the calculation of the total enzyme requirement.

Once the starch has been adequately liquefied, the temperature of the mixture is raised to denature of inactivate the enzyme. Suitable deactivation temperatures are within the range of from 95° to 110° C.

The deactivation need not necessarily be accomplished by the use of heat, or the use of heat alone. For instance, it can partially or entirely be accomplished by the addition of $HgCl_2$ to the mixture, in amounts of up to 0.05% wt, based on weight of water, 0.5% by weight based on starch weight.

Other conventional methods for deactivating the enzyme involve the addition of heavy metals generally, and preferably addition of ions of $Ag^+$, $Cu^{++}$, $Hg^{++}$, or $Pb^{++}$. $Ag^+$ ions are especially effective, particularly in concentrations of from 1 part per 500,000. The residual enzymes can also be inactivated by the use of oxidizing agents or specific materials such as p-chloromercuribenzoate, iodoacetate, trivalent arsenides, ferrocyanide, iodine or the like.

Having now generally described the invention, a further understanding can be attained by reference to certain specific Examples which are provided herein for purposes of illustration only, and are not intended to be construed as limiting of the invention unless otherwise specified.

EXAMPLE 1

Formation of Washonupana Barley

Barley has 7 chromosomes which are identifiable morphologically and genetically. The genes, of course, are located on these chromosomes. The gene $n\ n$ is naked seed characteristic; as compared to $N\ n$, which is covered seed, and $N\ N$, which is also covered seed. The $N\ n$ plant will produce progeny that may be covered or naked, i.e., segregate. $N\ N$ and $n\ n$ plants will always breed true, covered or naked, respectively. The genes of washonupana barley are $n\ n$ (naked seed), $wx\ wx$ (waxy endosperm gene) and $lk2\ lk2$ (short awn). $Wx$ and $Lk2$ are the normal endosperm and long awn genes, respectively.

The genetic complement of Washonupana on chromosome 1 is $$\frac{lk2 \quad\quad n \quad\quad Msg10 \quad wx}{lk2 \quad\quad n \quad\quad Msg10 \quad wx}$$

--------- = chromosome segment from Sermo

·········· = chromosome segment from Waxy Oderbrucker

The remainder of the chromosome is probably from Compana

Msg10 is the fertile gene, as compared with msg10 which is the male sterile gene.

Washonupana was developed by crossing Compana msg10 msg10 male sterile with Sermo. This cross was repeated 7 times in each instance using a short awned $lk2\ lk2$ naked $n\ n$ $F_2$ segregate as the male. Map-wise the cross was:

$$\frac{Lk2\ N\ msg10\ Wx}{Lk2\ N\ msg10\ Wx}\ \text{(male sterile Compana)}$$

$$\times$$

$$\frac{lk2\ n\ Msg10\ Wx}{lk2\ n\ Msg10\ Wx}\ \text{(Sermo)}$$

This then gave rise to the following fertile non-segregating backcross genotypes.

1. $\dfrac{lk2\ n\ Msg10\ Wx}{lk2\ n\ Msg10\ Wx}$   2. $\dfrac{lk2\ N\ Msg10\ Wx}{lk2\ N\ Msg10\ Wx}$ 3. $\dfrac{Lk2\ n\ Msg10\ Wx}{Lk2\ n\ Msg10\ Wx}$   4. $\dfrac{Lk2\ N\ Msg10\ Wx}{Lk2\ N\ Msg10\ Wx}$ Compana itself is of the genotype:

5. $\dfrac{Lk2\ N\ Msg10\ Wx}{Lk2\ N\ Msg10\ Wx}$

Genotypes 1, 2, 3 and 5 were evaluated and there was no evidence of the amylase bonding effect characteristics of Washonupana. Note these are all normal endosperm types.

Subsequent to the completion of the above crosses a second backcross program was started that led to Wapana. Compana msg10 msg10 plants were crossed with Waxy Oderbrucker as the male. $F_2$ waxy endosperm segregates were crossed again to male sterile Compana. This was continued until Compana had recurred in the progeny 7 times. Map-wise the cross was:

$$\frac{Lk2\ N\ msg10\ Wx}{Lk2\ N\ msg10\ Wx}\ \text{(Male sterile Compana)}$$

$$\times$$

$$\frac{Lk2\ N\ Msg10\ wx}{Lk2\ N\ Msg10\ wx}\ \text{(Waxy Oderbrucker)}$$

These crosses then gave rise to the following fertile non-segregating backcross genotypes.

6. $\dfrac{Lk2\ N\ Msg10\ wx}{Lk2\ N\ Msg10\ wx}$   7. $\dfrac{Lk2\ N\ Msg10\ Wx}{Lk2\ N\ Msg10\ Wx}$ Genotype 6 was evaluated and there was no evidence of the amylase bonding effect characteristics of Washonupana. Genotype 6 is Wapana.

To produce Washonupana another male sterile genotype from the first cross, i.e., from the same last cross as genotypes 1 through 4, was selected as female parent and crossed with genotype 6 as the male. This cross is represented as:

$\dfrac{lk2\ n\ msg10\ Wx}{lk2\ n\ msg10\ Wx}$ (Sermo/7/Compana)

×

$\dfrac{Lk2\ N\ Msg10\ wx}{Lk2\ N\ Msg10\ wx}$ (Wapana)

The $lk2\ n$ msg10 female was used since this particular chromosome segment had seemed to produce something slightly different from Compana in viscosity curves, seedling growth, and in nutrition studies. Also, all the homozgous (true breeding) combinations could be recovered from this cross. They are:

8. $\dfrac{lk2\ n\ Msg10\ wx}{lk2\ n\ Msg10\ wx}$   9. $\dfrac{lk2\ N\ Msg10\ wx}{lk2\ N\ Msg10\ wx}$ 10. $\dfrac{lk2\ n\ Msg10\ Wx}{lk2\ n\ Msg10\ Wx}$   11. $\dfrac{lk2\ N\ Msg10\ Wx}{lk2\ N\ Msg10\ Wx}$ 12. $\dfrac{Lk2\ n\ Msg10\ wx}{Lk2\ n\ Msg10\ wx}$   13. $\dfrac{Lk2\ N\ Msg10\ wx}{Lk2\ N\ Msg10\ wx}$ 14. $\dfrac{Lk2\ n\ Msg10\ Wx}{Lk2\ n\ Msg10\ Wx}$   15. $\dfrac{Lk2\ N\ Msg10\ Wx}{Lk2\ N\ Msg10\ Wx}$ Genotype 8 is Washonupana.

EXAMPLE 2

Washonupana, as described above, was treated by a wet milling technique as described in Goering, et al, Barley Starch V, *A Comparison of the Properties of Waxy Compana Barley Starch With the Starches of Its Parents, Cereal Chemistry,* 50:322 (1973).

Corn starch was obtained from CPC International in unmodified form, and a waxy maize starch, Amioca Waxy Maize Starch, was obtained from American Maize Products Co.

For controls, the amylase associated with the Washonupana granular starch was inactivated by dissolving 200 mg of $HgCl_2$ in 420 ml of $H_2O$ used to suspend the starch sample.

These samples were prepared, each containing 33.6 parts by weight of starch granules (dry basis) separated from Bozeman grown Washonupana, Mesa grown Washonupana and inactivated Washonupana, respectively. To the fraction was added 420 parts by weight of water. The mixtures were each heated at the rate of 1.5°/min until they reached 92.5° C. The samples were cooked for 60 minutes at 92.5° C. and then cooled to 50° C. The results are shown in FIG. 1. As can be seen from that figure, the maximum viscosity of both the active Washonupana samples was relatively low and rapidly fell to the base line even before reaching the cooking temperature of 92.5° C. due to self-liquefaction. In contrast, the Washonupana which had been inactivated with the $HgCl_2$, pastes over a period of 30–40 minutes during which period the viscosity goes above 1000 B.U., and then the viscosity begins to drop back to about 400 B.U. as the granules begin to break down by the continued application of heat and agitation. An examination of the inhibited Washonupana showed that essentially no liquefication has occurred since the curve obtained is nearly identical to waxy maize starch and waxy Compana barley starch, when run at the same concentration, neither of which contains any α-amylase.

The results of the first few Brabender viscosity curves were completely unexpected; so new starch samples were prepared to eliminate any possibility of modification during their preparation. These gave the same results; namely, after peaking at slightly over 200 B.U., the viscosity rapidly dropped until at 85° C. it was down to 20 units. The viscosity continued to drop during the heating and cooking stage. After cooling to 50° C., and holding for one hour, it was only 15 B.U. On the assumption that the observed results were due to the binding of barley amylase to the granule, runs were made using $HgCl_2$ as an inhibitor. To examine the effect of environment, starch prepared from seeds grown at both Mesa, Ariz. and Bozeman, Mont. were used.

It is apparent from FIG. 1 that the results observed were not due to environment although the amylase activity of the Arizona sample appeared to be slightly greater than that observed in the Bozeman sample. This might be due to different levels of plant nutrients in the soil in the two areas. Since the curve obtained by the use of $HgCl_2$ was essentially identical to that obtained from the parent waxy Compana (1), it must be concluded the low values obtained from the Washonupana are due to adhering amylase.

EXAMPLE 3

Cereal amylases are known to be heat labile. However, on the assumption that a starch with a low pasting temperature might be liquefied by the Washonupana amylase before the enzyme was inactivated, a series of experiments was run in which the heating phase was interrupted by holding for 1 hour at 70° C. before completion of the heating cycle. These samples were then cooked at 92.5° C. for 15 minutes and cooled to 50° C. Quite arbitrarily, a concentration of 20 percent (SAH Waxy Compana) Washonupana and 80 percent waxy maize was used at the 8 percent level for these experiments. To again examine the effect of the inhibition of amylase, a control was run with added $HgCl_2$. These results are shown in FIG. 2.

FIG. 2 demonstrates that the Washonupana starch has sufficient amylase to liquefy itself and four times its weight of waxy maize.

EXAMPLE 4

The experiment of Example 2 was repeated, except using unmodified corn starch instead of waxy maize. Corn starch was selected because it does not ordinarily paste at 70° C., (BEPT 74°–75°) whereas waxy maize appears to paste at this temperature. Again, a control sample was run using $HgCl_2$ as an amylase inhibitor. These curves are shown in FIG. 3.

It is apparent that 20 percent Washonupana will also liquefy itself and four times its weight of unmodified corn starch. This amylase appears to be heat sensitive and like other barley amylases probably has a temperature optimum in the range of 60°-65° C. However, since normal starches do not paste at this temperature, it could not be effective when used in this manner unless the added starch was precooked, and even then the Washonupana used for liquefication would not be efficiently thinned.

The control sample in FIG. 3 is interesting because it shows two pasting peaks. The first is, in all probability, primarily due to the waxy barley starch. The second peak is probably a result of the pasting of the more resistant fraction of the normal corn starch. The rapid drop of viscosity during the cooking cycle is a normal property of waxy starches. The potential applications for this new starch source are unlimited. For instance, the grain from Washonupana can be ground, added to water, heated at 70° C. to convert the starch to fermentable sugars which will allow the mixture to be fermented without cooking to provide a source of grain alcohol.

Having now fully described the invention, it will be apparent to one of ordinary skill in the art that many changes and modifications can be made thereto without departing from the spirit or scope of the invention as set forth herein. ACCORDINGLY,

What is claimed as new and intended to be covered by Letters Patent is:

1. A method for forming a liquified starch which comprises separating starch granules from the grain of the barley variety Washonupana which has been obtained by cross-breeding a first barley variety characterized by the hullness gene $n\ n$ on chromosome 1, and a second barley variety which is characterized by the waxy endosperm gene $wx\ wx$ on chromosome 1, which granules, when said granules are heated to a temperature of from 67° to 75° C., are self liquefying without the introduction of any outside source of enzymes, admixing said starch granules with water to form a slurry, heating said slurry until said starch granules form a paste which is then liquefied by the enzymatic activity of the amylase contained within said granules, without the addition of any other amounts of enzyme, and recovering the liquefied starch.

2. The method of claim 1, wherein said first variety is characterized by the short awn gene $lk2\ lk2$ and the hulless gene $n\ n$ on chromosome 1.

3. The method of claim 1, wherein said slurry is heated to a temperature of from 65° to 75° C. to effect pasting of the starch, and is further heated to a temperature of from 75° to 92.5° C. to effect liquefication of the starch.

4. The method of claim 1, wherein said slurry is heated to a temperature of from 65° to 92.5° C. whereby pasting and liquefication of said starch occurs, to obtain a viscosity of from 0 to 20 B.U.

5. The method of claim 4, wherein said slurry is heated to a temperature of from 70°-75° C.

6. The method of claim 1, wherein up to 500% by weight of a non-self liquefying starch is admixed with said barley variety.

7. The method of claim 6, wherein from 100-500% by weight of said non-self liquefying starch is admixed.

8. The method of claim 7, wherein said non-self liquefying starch is corn starch or waxy maize starch.

9. Barley starch granules from the barley variety Washonupana which contain a sufficient amount of native α-amylase after separation from the grain so as to be characterized by being self-liquefying without the addition of further amounts of amylase, when said granules are heated to a temperature of from 67° to 75° C.

10. The barley starch granules of claim 9, which are obtained by separation from the grain of a barley variety prepared by cross-breeding a first barley variety characterized by the hulless gene $n\ n$ on chromosome 1, and a second barley variety which is characterized by the waxy endosperm gene $wx\ wx$ on chromosome 1.

11. The barley starch granules of claim 9, wherein said barley variety is obtained by cross-breeding a first barley variety characterized by the short awn gene $lk2\ lk2$ and the hulless gene $n\ n$ on chromosome 1, and a second variety characterized by the waxy endosperm gene $wx\ wx$ on chromosome 1.

12. Barley starch granules from the barley variety Washonupana which are obtained by separation from the grain of a barley variety having the genetic characteristics of $$\frac{lk2\ n\ wx}{lk2\ n\ wx}, \text{ wherein}$$

wherein said granules contain an amount of amylase which is capable of effecting self-liquefication of said granules when the granules are heated to a temperature of from 67° to 75° C.

13. A slurry of the barley starch granules of claim 9 and water.

14. The slurry of claim 13 heated to a temperature of from 65° to 92.5° C.

* * * * *

UNITED STATES PATENT AND TRADEMARK OFFICE
CERTIFICATE OF CORRECTION

PATENT NO. : 4,116,770

DATED : September 26, 1978

INVENTOR(S) : Goering et al.

It is certified that error appears in the above-identified patent and that said Letters Patent are hereby corrected as shown below:

Column 2, line 9, delete "which" and insert --and--;

Column 3, line 36, delete "show" and insert --shows--;

Column 4, line 42, delete ", The" and insert --. The--;

Column 5, line 9, delete "face" and insert --fact--;

Column 7, line 36, delete "of" (2nd occurrence) and insert -- or --;

Column 8, line 49, delete "5" and insert --4--;

Column 11, line 28 (Claim 1, line 1), delete "liquified" and insert --liquefied--;

Column 12, line 40 (Claim 12, line 5), delete "wherein".

Signed and Sealed this

Second Day of October 1979

[SEAL]

Attest:

RUTH C. MASON
Attesting Officer

LUTRELLE F. PARKER
Acting Commissioner of Patents and Trademarks